United States Patent [19]

Harshaw et al.

[11] Patent Number: 4,970,683
[45] Date of Patent: Nov. 13, 1990

[54] COMPUTERIZED CHECKLIST WITH PREDETERMINED SEQUENCES OF SUBLISTS WHICH AUTOMATICALLY RETURNS TO SKIPPED CHECKLISTS

[75] Inventors: Robert C. Harshaw; Ronald S. Burkey; James T. Doell; Dennis G. Keith, all of Dallas, Tex.

[73] Assignee: Heads Up Technologies, Inc., Carrollton, Tex.

[21] Appl. No.: 423,574

[22] Filed: Oct. 16, 1989

Related U.S. Application Data

[63] Continuation of Ser. No. 900,421, Aug. 26, 1986, abandoned.

[51] Int. Cl.⁵ .............................................. G06F 15/00
[52] U.S. Cl. .................................. 364/900; 364/925.1; 364/948.1; 364/948.2; 364/424.06
[58] Field of Search ... 364/200 MS File, 900 MS File, 364/424.01, 424.05, 424.06; 340/945, 953, 706, 721

[56] References Cited

U.S. PATENT DOCUMENTS

| | | | |
|---|---|---|---|
| 3,535,683 | 10/1970 | Woods et al. | 364/900 |
| 3,798,611 | 3/1974 | Gallant | 364/900 |
| 3,999,050 | 12/1976 | Pitroda | 235/152 |
| 4,162,610 | 7/1979 | Levine | 58/148 |
| 4,251,813 | 2/1981 | Carre | 340/706 |
| 4,365,315 | 12/1982 | Jamnik | 364/900 |
| 4,490,711 | 12/1984 | Johnston | 340/309.4 |
| 4,498,787 | 2/1985 | Jung-Sun | 368/10 |
| 4,504,153 | 3/1985 | Schollmeyer et al. | 368/10 |
| 4,530,068 | 7/1985 | Nakanishi et al. | 364/900 |
| 4,541,056 | 9/1985 | Matthews | 364/200 |
| 4,548,510 | 10/1985 | Levine | 368/10 |
| 4,576,484 | 3/1986 | Grossmeyer | 368/245 |
| 4,584,786 | 4/1986 | Georgpulos | 40/448 |
| 4,588,303 | 5/1986 | Wirtschafter et al. | 368/10 |
| 4,604,711 | 8/1986 | Benn et al. | 364/900 |
| 4,635,030 | 1/1987 | Rauch | 340/721 |
| 4,677,429 | 6/1987 | Glotzbach | 364/424 |
| 4,688,026 | 8/1987 | Scribner et al. | 340/572 |

FOREIGN PATENT DOCUMENTS 2050979  1/1981  United Kingdom .

Primary Examiner—Thomas C. Lee
Attorney, Agent, or Firm—David H. Judson

[57] ABSTRACT

A computerized checklist system is provided for ensuring safe and consistent operation of sophisticated equipment such as aircraft, milling machines, and other complicated systems. The checklist system includes a microprocessor having an erasable programmable read only memory for storing alphanumeric data in the form of checklist items. A display panel is provided for visual output of the checklist items, and a voice synthesizer is provided for audible output of the checklist items. The system is designed to accommodate checklists in the form of a number of sublists, with each sublist comprising checklist items in a predetermined sequence. A control panel is provided to initiate the checklist sequence, progress through the sequence of items, skip items in the sequence, return to skipped items automatically at the end of the sequence, and exit the sequence at any time upon command.

9 Claims, 2 Drawing Sheets

COMPUTERIZED CHECKLIST WITH PREDETERMINED SEQUENCES OF SUBLISTS WHICH AUTOMATICALLY RETURNS TO SKIPPED CHECKLISTS

This application is a continuation, of application Ser. No. 900,421, filed Aug. 26, 1986.

TECHNICAL FIELD

This invention relates to self-contained data storage and display devices and, in particular, to a computerized aircraft checklist system that displays and speaks preprogrammed alphanumeric data in a predetermined sequence.

BACKGROUND OF THE INVENTION

Printed checklists have been used extensively in many fields to ensure the safe and consistent operation of sophisticated equipment and systems. In the field of aviation in particular, aircraft avionics and other flight control systems have become so complex that it is not feasible for pilots to remember the proper sequence of events associated with the operation of aircraft during normal flight or emergency situations. In fact, the Federal Aviation Agency requires that all aircraft carry a complete checklist of items and functions to be performed by the pilot during the various stages of flight. In theory, the pilot is required to read the checklist during each stage of the flight to assure that the proper tasks are completed at the proper time so as to reduce the possibility of pilot error during flight.

With the introduction of computers to aircraft avionics, onboard aircraft systems now possess far greater capabilities, but they also require more attention from the pilot than older, less sophisticated systems. In small, single-engine aircraft the checklist may be printed on a single page, but in sophisticated multi-engine aircraft the checklist may comprise an entire book.

Lengthy aircraft checklists, which were originally required for reasons of safety, have the negative result of causing pilots to spend a greater percentage of their time reading checklists. Unfortunately, the increased time spent reading checklists reduces the time the pilots have available to look outside the aircraft for hazards to safe flight. In addition, lengthy checklists increase the possibility of pilot error caused by the accidental omission of checklist items.

Failure to use aircraft checklists properly has been mentioned often in aircraft accident investigation reports. In fact, the National Transportation Safety Board has determined that the failure to use or the misuse of checklists was a probable cause or a contributing factor in approximately three-fourths of the aircraft accidents investigated in recent years. However, despite the obvious importance of proper checklist procedures for the safe operation of aircraft, very little has been done to change or improve the basic printed aircraft checklist. Thus, there is a great need for an improved aircraft checklist which is easy to use, which allows the pilot to spend more time looking outside the aircraft, and which prevents the accidental omission of checklist items.

SUMMARY OF THE INVENTION

The present invention is a computerized checklist system designed to ensure the safe and consistent operation of sophisticated equipment such as aircraft and other complicated systems. The checklist system includes a microprocessor and a display/control panel all in a self-contained unit suitable for installation in an aircraft instrument panel.

The microprocessor of the present invention includes a memory storage unit such as an Erasable Programmable Read Only Memory (EPROM) for storing and updating alphanumeric data in the form of checklist items. Each checklist item is typically in the two-part, "Challenge-Response" format that is preferred by most pilots, although other checklist formats may be provided. The control panel of the system includes a Liquid Crystal Display (LCD) for displaying the checklist items and several buttons for operating the sequence of checklist items. In addition, the present invention includes a voice synthesizer for providing an audible reading of each checklist item as it is displayed on the LCD.

In operation, the EPROM of the system is preprogrammed with the proper checklist items in the proper sequence for the particular type of aircraft in which the system is installed. The system is used by the pilot by turning it on and pressing the control buttons to progress through the sequence of checklist items. The system is designed to accommodate checklists which comprise a number of sublists, with each sublist having a sublist title that is displayed and spoken by the system. Each sublist comprises a sequence of actual checklist items that are displayed and spoken so that they can be accomplished by the pilot.

After the checklist system is turned on, the microprocessor indexes the first sublist and then displays and speaks that sublist title. If the pilot wishes to skip the first sublist and proceed to the second sublist, the pilot pushes the SKIP button. If the pilot wishes to proceed with the checklist items in the presently displayed sublist, the pilot pushes the GO button and the microprocessor displays and speaks the first checklist item in that sublist. After the pilot completes each checklist item, he pushes the GO button and the microprocessor displays and speaks the next checklist item in the sequence. If the pilot wishes to skip an item, he pushes the SKIP button and the microprocessor proceeds to the next item in the sequence. After the pilot responds to the last sublist item in the sequence, the microprocessor returns to display and speak each skipped item in sequence. When the pilot has completed all sublist items by responding with the GO button, the computer responds by announcing "COMPLETE" and indexing to the next sublist title. The pilot can exit a sublist at any time by pushing the EXIT button, which returns the display to the current sublist title.

The computerized checklist system of the present invention provides the pilot with more time to attend to other duties by speaking each checklist item to the pilot rather than requiring the pilot to divert his attention to read the checklist. The voice synthesizer may direct its output to a separate speaker or directly to the aircraft intercom system. In addition, the control buttons may be placed at a position remote from the display panel for the convenience of the pilot. Furthermore, the computerized checklist system of the present invention manages the checklist items to prevent the unintentional omission of one or more items in the checklist sequence.

BRIEF DESCRIPTION OF THE DRAWINGS

For a more complete understanding of the present invention and for further advantages thereof, reference is now made to the following Description of the Preferred Embodiment taken in conjunction with the accompanying Drawings, in which.

DESCRIPTION OF THE PREFERRED EMBODIMENTS

Figure 1:
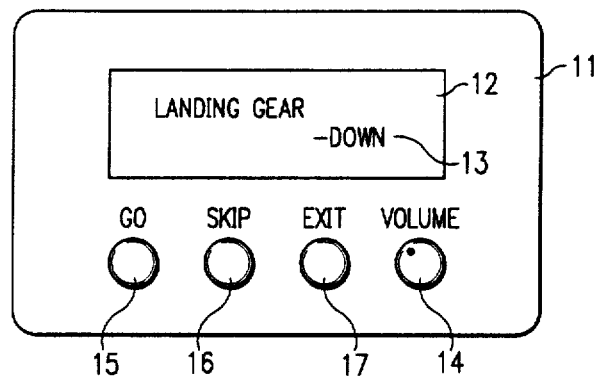
FIG. 1 is a front plan view of the display/control panel of the present invention.

Referring to FIG. 1, the computerized checklist system of the present invention is generally identified by reference numeral 10. Computerized checklist system 10 includes a display/control panel 11, a Liquid Crystal Display (LCD) 12 for displaying alphanumeric checklist items 13, an on/off/volume knob 14, and push buttons 15, 16, and 17.

Figure 2:
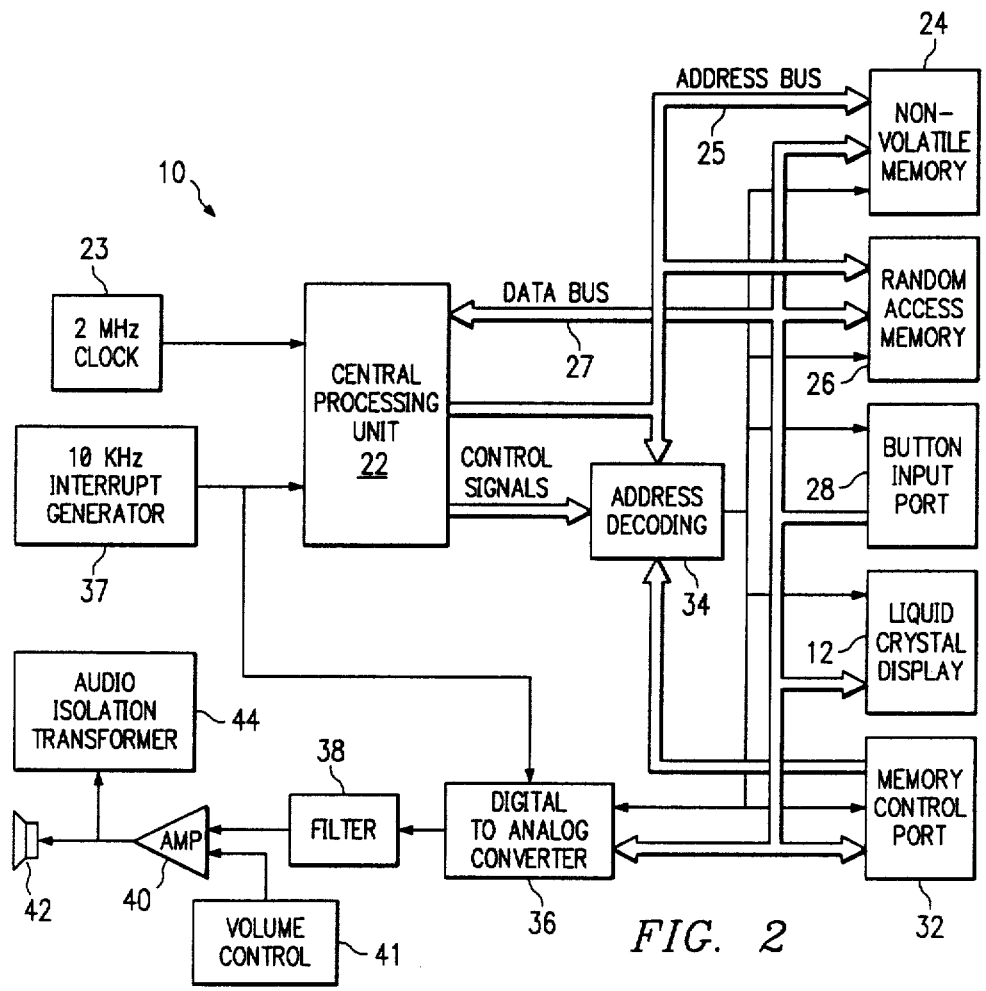
FIG. 2 is a block diagram of the components of the present invention.

A block diagram of the major components of computerized checklist system 10 is shown in FIG. 2. Microprocessor 22, which may be based on a Zilog Z-80 microcomputer chip, forms the core of checklist system 10. Microprocessor 22 receives input from clock 23 and interrupt generator 37, and provides output along address bus 25 to non-volatile memory 24, random access memory 26, and address decoder 34. Non-volatile memory 24 may comprise an Erasable Programmable Read Only Memory (EPROM) which may be preprogrammed and periodically updated to contain the checklist items 13 required for the specific type of aircraft in which checklist system 10 is installed.

Microprocessor 22 is also connected by data input/output bus 27 to non-volatile memory 24, random access memory 26, button input port 28, Liquid Crystal Display 12, memory control port 32, and digital-to-analog converter 36. Converter 36 includes a voice synthesizer which converts digital data into audible speech using a process such as that disclosed by U.S. Pat. No. 4,214,125. The output of converter 36 passes through filter 38 to amplifier 40 which has a volume control 41. The signal from amplifier 40 may be input to a speaker 42 or may be input to audio isolation transformer 44 to be provided directly to the aircraft intercom system. Thus, microprocessor 22 provides the output of alphanumeric checklist items 13 stored in memory 24 to the pilot in the form of audible speech as well as a visible display on LCD 12.

Figure 3:
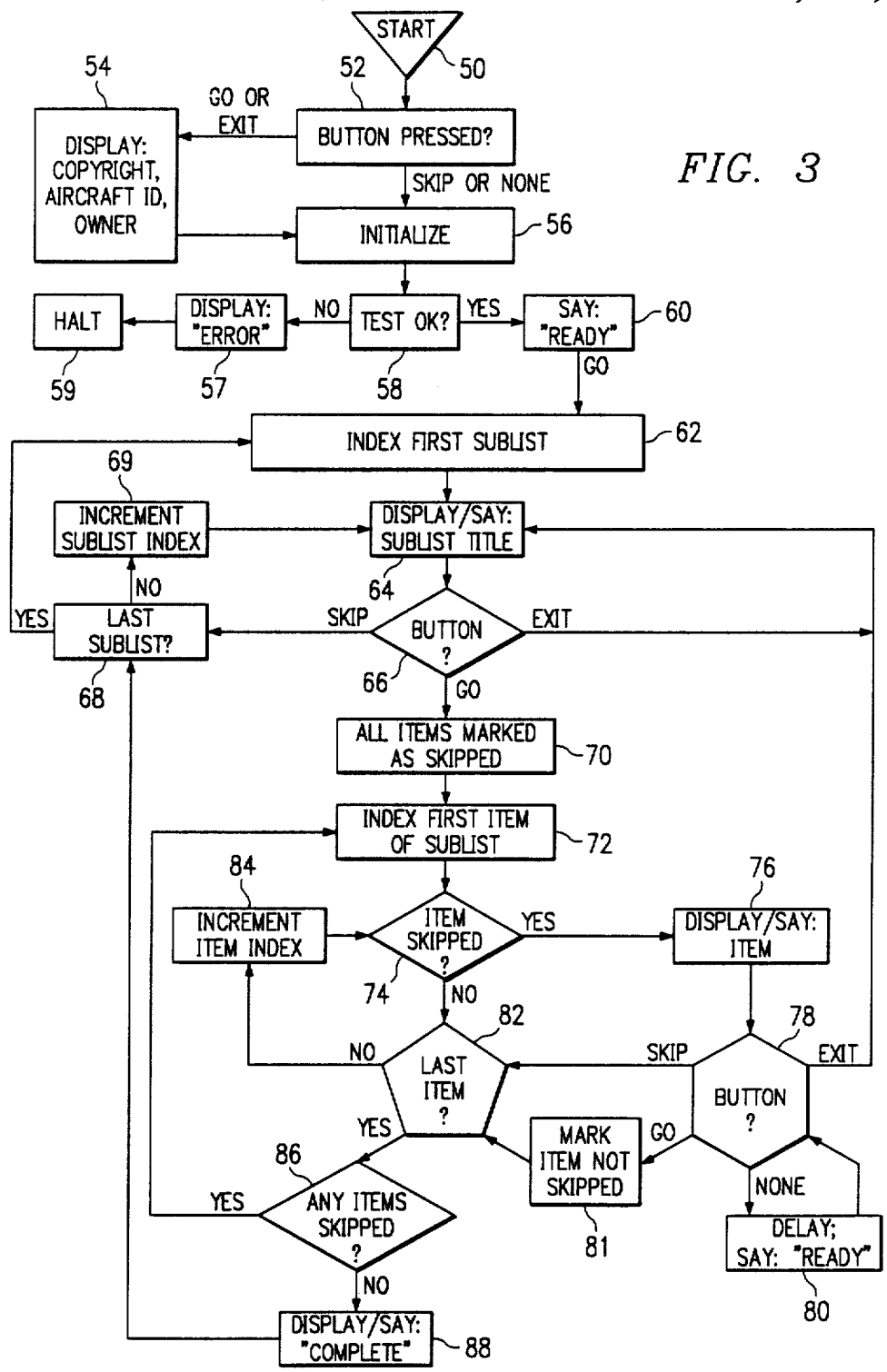
FIG. 3 is a logic flow diagram illustrating the operation of the present invention.

The operation of display/control panel 11 of FIG. 1 is illustrated in the logic flow diagram of FIG. 3. Operation of checklist system 10 is started 50 by turning on volume control knob 14. If the GO button 15 or EXIT button 17 is pressed 52, LCD 12 may display information 54 such as a copyright notice for the system software, the aircraft identification, or the name of the aircraft owner. Following display 54, the system 10 will automatically initialize itself 56. If the SKIP button 16 or no button is pressed 52, the system will automatically initialize itself 56 and omit display 54. In addition to the GO button 15 and SKIP button 16 located on panel 11, auxiliary GO and SKIP buttons may be placed in a position remote from panel 11 for the convenience of the pilot.

After the system 10 has initialized itself 56, the system 10 conducts a self-test 58. If the system 10 fails the test 58, LCD 12 displays an error message 57 and checklist system 10 halts operation 59. If the system 10 passes test 58, the system 10 displays and announces "READY" 60.

Computerized checklist system 10 is designed to store and output checklist items 13 as elements of various sublists such as "Engine Start", "Before Takeoff", and "Before Landing", for example. After the system 10 has announced "READY" 60, pushing the GO button indexes the first sublist 62 and causes the system 10 to automatically display and speak the title of the sublist 64. Next, the pilot cues the checklist by pressing 66 one of the control buttons. If the pilot wishes to bypass the sublist being displayed, he presses the SKIP button 16. If the sublist being skipped is not the last sublist 68 in the sequence, the system 10 increments the sublist index 69 and displays and speaks the title of the next sublist 64 in the sequence. If the system determines that the sublist being skipped is the last sublist 68, the system 10 indexes the first sublist and displays and speaks the first sublist title 64. If the pilot presses 66 the EXIT button 17, the system 10 merely repeats the current sublist title 64. If the pilot presses 66 the GO button 15, the system proceeds with the checklist items 13 in the current sublist.

When the pilot enters a sublist by pressing the GO button 15, the system 10 initially marks all checklist items in that sublist as being skipped 70. The system 10 then automatically indexes the first item of the sublist 72. At decision point 74, the system 10 ascertains whether or not the indexed item has been marked as skipped. If the item has been skipped, the system 10 displays and speaks the checklist item 76, preferably in the two-part, challenge-response format illustrated by item 13. After a checklist item 13 has been announced 76, the pilot must respond by pressing 78 a control button. If the pilot fails to press a control button before a predetermined time limit, the system will announce "READY" 80 to remind the pilot that a response is required. If the pilot presses the EXIT button 17, the system returns to the current sublist title 64. If the pilot completes the checklist item 13 in the normal course, he presses 78 the GO button 15 and the system marks the checklist item as not being skipped 81. If the pilot wishes to bypass the checklist item 13 presented for response, he presses the SKIP button 16. After the pilot has pressed the GO or SKIP buttons, the system 10 ascertains whether or not the current checklist item 13 is the last item 82 in the sequence. If the current item 13 is not the last item 82, the system 10 increments the item index 84 and proceeds with the next item in the sequence. The system 10 continues with the loop 74, 76, 78, 82, and 84 until all checklist items in the sequence have been presented to the pilot. When the system 10 reaches the last item 82 in a sublist, the system 10 ascertains whether any items in that sublist have been skipped 86 by the pilot. If any checklist items have been skipped, the system 10 returns to 72, indexes the first item of the sublist, and proceeds through the loop as described above. When the system 10 has determined that the pilot has responded to all checklist items in the sublist by pressing the GO button 15 to mark all items as not being skipped 81, the system 10 determines that no items have been skipped 86 and displays and announces "COMPLETE" 88. After a sublist has been completed, the system 10 automatically returns to 68 to determine whether or not the completed sublist was the last sublist 68. If the completed sublist was not the last sublist 68, the system 10 increments the sublist index 69 and displays and says the title of the next sublist 64. Thereafter, the system 10 proceeds through the remaining sublists and sublist items as described above.

The computerized checklist system 10 of the present invention is designed to function like an additional crew member whose only responsibility is to read and manage the aircraft checklist. The pilot does not have to read or fumble with a written checklist, which improves flight safety by reducing the cockpit workload. Furthermore, the computerized checklist system 10 provides an accurate and consistent presentation of checklist items 13 in sequence without the possibility of inadvertently omitting an item in the sequence.

Although the present invention has been described with respect to a specific preferred embodiment of the computerized checklist system, various changes and modifications may be suggested to one skilled in the art, and it is intended that the present invention encompass such changes and modifications as fall within the scope of the appended claims.

We claim:

1. A computerized checklist system, comprising:
    a digital processor for controlling the operation of the checklist system;
    storage means connected to the processor for storing alphanumeric data organized in a predetermined sequence of sublists, wherein each of the sublists has a title and includes a predetermined sequence of checklist items, each checklist item including a challenge having a corresponding response;
    first switch means for enabling an operator of the checklist system to enter an action complete signal, indicating that the operator has completed a response to a challenge, second switch means for enabling the operator to enter a skip signal indicating that the operator desires to delay completion of a response to a challenge, and third switch means for enabling the operator to enter an exit signal indicating that the operator desires to exit a sublist being processed;
    means connected to the first, second and third switch means and the digital processor for detecting entry by the operator of an action complete signal, a skip signal or an exit signal;
    a display connected to the digital processor for selectively displaying a sublist title or a checklist item;
    a voice synthesizer connected to the digital processor for providing an audible output corresponding to each sublist title or checklist item displayed on the display, the audible output being provided concurrently with the display of the sublist title or the checklist item; and
    program control means for controlling the digital processor to effect presentation, by the display and the voice synthesizer, of the alphanumeric data in the predetermined sequence of sublists starting with a first sublist and a first checklist item in the first sublist, the program control means including:
    first means responsive to detection of an action complete signal following announcement and display of a sublist title or any checklist item in a sublist being processed for displaying a next checklist item in the sublist being processed while concurrently providing an audible output announcing the next checklist item;
    second means responsive to detection of a skip signal following announcement and display of any checklist item in a sublist being processed for skipping the checklist item and automatically displaying a next checklist item in the sublist being processed while concurrently providing an audible output announcing the next checklist item;
    third means responsive to detection of an exit signal following announcement and display of any checklist item in a sublist being processed for automatically displaying and announcing the title of the sublist being processed as if all of the checklist items therein still require processing;
    fourth means responsive to detection of an action complete signal following announcement and display of a last checklist item in a sublist being processed for automatically recalling skipped checklist items, and for displaying and announcing each such skipped checklist item in the same sequence that said items were skipped; and
    fifth means responsive to detection of an action complete signal for all checklist items in the sublist being processed for automatically indexing to a next sublist in the predetermined sequence of sublists and for displaying and announcing the title of the next sublist.

2. The computerized checklist system of claim 1, wherein said storage means comprises an erasable programmable read only memory.

3. The computerized checklist system of claim 1, wherein the program control means further comprises:
    sixth means responsive to a failure to detect an action complete signal within a predetermined period of time after any checklist item is announced and displayed for announcing and displaying a reminder prompt.

4. The computerized checklist system of claim 2, wherein said sixth means repeats said reminder prompt until an action complete signal or skip signal is detected.

5. The computerized checklist system of claim 1, wherein said checklist is preprogrammable.

6. The computerized checklist system of claim 1, further comprising:
    means for self-testing said system; and
    means for terminating the presentation of said checklist if said self-testing means detects an error.

7. The computerized checklist system of claim 6, further comprising:
    means connected to said self-testing means for generating an error signal if said self-testing means detects an error in said system.

8. A computerized checklist system, comprising:
    a digital processor for controlling the operation of the checklist system;
    storage means connected to the processor for storing alphanumeric data organized in a predetermined sequence of sublists, wherein each of the sublists has a title and includes a predetermined sequence of checklist items, each checklist item including a challenge having a corresponding response;
    first switch means for enabling an operator of the checklist system to enter an action complete signal, indicating that the operator has completed a response to a challenge, second switch means for enabling the operator to enter a skip signal indicating that the operator desires to delay completion of a response to a challenge, and third switch means for enabling the operator to enter an exit signal indicating that the operator desires to exit a sublist being processed;
    means connected to the first, second and third switch means and the digital processor for detecting entry by the operator of an action complete signal, a skip signal or an exit signal;

a voice synthesizer connected to the digital processor for providing an audible output corresponding to each sublist title or checklist item; and program control means for controlling the digital processor to effect presentation, by the voice synthesizer, of the alphanumeric data in the predetermined sequence of sublists starting with a first sublist and a first checklist item in the first sublist, the program control means including:

- first means responsive to detection of an action complete signal following announcement of a sublist or any any checklist item in a sublist being processed for providing an audible output announcing the next checklist item;
- second means responsive to detection of a skip signal following announcement of any checklist item in a sublist being processed for skipping the checklist item and automatically providing an audible output announcing the next checklist item;
- third means responsive to detection of an exit signal following announcement of any checklist item in a sublist being processed for automatically announcing the title of the sublist being processed as if all of the checklist items therein still require processing;
- fourth means responsive to detection of an action complete signal following announcement of a last checklist item in a sublist being processed for automatically recalling skipped checklist items, and for announcing each such skipped checklist item in the same sequence that said items were skipped; and
- fifth means responsive to detection of an action complete signal for all checklist items in the sublist being processed for automatically indexing to a next sublist in the predetermined sequence of sublists and providing an audible output announcing the title of the next sublist.

9. A computerized checklist system, comprising:

a digital processor for controlling the operation of the checklist system;

storage means connected to the processor for storing alphanumeric data organized in a predetermined sequence of sublists, wherein each of the sublists has a title and includes a predetermined sequence of checklist items, each checklist item including a challenge having a corresponding response;

first switch means for enabling an operator of the checklist system to enter an action complete signal, indicating that the operator has completed a response to a challenge, second switch means for enabling the operator to enter a skip signal indicating that the operator desires to delay completion of a response to a challenge, and third switch means for enabling the operator to enter an exit signal indicating that the operator desires to exit a sublist being processed;

means connected to the first, second and third switch means and the digital processor for detecting entry by the operator of an action complete signal, a skip signal or an exit signal;

a display connected to the digital processor for selectively displaying a sublist title or a checklist item; and program control means for controlling the digital processor to effect presentation, by the display, of the alphanumeric data in the predetermined sequence of sublists starting with a first sublist and a first checklist item in the first sublist, the program control means including:

- first means responsive to detection of an action complete signal following display of a sublist title or any checklist item in a sublist being processed for displaying a next checklist item in the sublist being processed;
- second means responsive to detection of a skip signal following display of any checklist item in a sublist being processed for skipping the checklist item and automatically displaying a next checklist item in the sublist being processed;
- third means responsive to detection of an exit signal following display of any checklist item in a sublist being processed for automatically displaying the title of the sublist being processed as if all of the checklist items therein still require processing;
- fourth means responsive to detection of an action complete signal following display of a last checklist item in a sublist being processed for automatically recalling skipped checklist items, and for displaying each such skipped checklist item in the same sequence that said items were skipped; and
- fifth means responsive to detection of an action complete signal for all checklist items in the sublist being processed for automatically indexing to a next sublist in the predetermined sequence of sublists and displaying the title of the next sublist.

* * * * *